US007687428B1

(12) United States Patent
Zhong et al.

(10) Patent No.: US 7,687,428 B1
(45) Date of Patent: *Mar. 30, 2010

(54) METHOD OF SYNTHESIZING AND PROCESSING CARBON-SUPPORTED, GOLD AND GOLD-BASED MULTIMETALLIC NANOPARTICLES FOR USE AS CATALYSTS

(75) Inventors: Chuan-Jian Zhong, Johnson City, NY (US); Jin Luo, Vestal, NY (US); Nancy N. Kariuki, Binghamton, NY (US); Linyang Wang, Binghamton, NY (US); Peter Njoki, Binghamton, NY (US); Derrick Mott, Bainbridge, NY (US)

(73) Assignee: The Research Foundation of the State University of New York, Binghamton, NY (US)

( * ) Notice: Subject to any disclaimer, the term of this patent is extended or adjusted under 35 U.S.C. 154(b) by 885 days.

This patent is subject to a terminal disclaimer.

(21) Appl. No.: 11/391,830

(22) Filed: Mar. 29, 2006

(51) Int. Cl.
*B01J 23/42* (2006.01)
*H01M 4/38* (2006.01)

(52) U.S. Cl. .................... 502/184; 429/218.1; 429/221; 429/224; 429/231.4; 429/231.8; 502/241; 502/242; 502/243; 502/305; 502/309; 502/313; 502/316; 502/326; 502/338; 502/339

(58) Field of Classification Search ................ 502/344, 502/101, 185, 184, 241, 242, 243, 305, 309, 502/313, 316, 317, 326, 338, 339; 429/42, 429/218.1, 221, 224, 231.4, 231.8
See application file for complete search history.

(56) References Cited

U.S. PATENT DOCUMENTS 3,239,382 A * 3/1966 Thompson .................... 429/44
7,208,439 B2 * 4/2007 Zhong et al. ................ 502/185

FOREIGN PATENT DOCUMENTS

EP          0557674 A1 *  1/1993

OTHER PUBLICATIONS

Yongbing Lou; Gold-Platinum alloy nanoparticle assembly as catalyst for methanol electrooxidation; 2001; Chem. Commun. DOI: 10.1039/b008669j; 473-474.*
Merriam Webster, New Collegiate Dictionary, G. & C. Merriam Company (1979), p. 105.*

* cited by examiner

*Primary Examiner*—Wayne Langel
*Assistant Examiner*—Syed Iqbal
(74) *Attorney, Agent, or Firm*—Nixon Peabody LLP

(57) ABSTRACT

A method of preparing carbon-loaded, gold-based nanoparticle catalysts useful as anode catalysts for the electrocatalytic methanol oxidation reaction (MOR) as well as the oxygen reduction reaction (ORR). $Au_mPt_nM_{100-m-n}$ catalysts may be prepared by either a two-phase protocol or by a thermal decomposition/reduction protocol. The prepared nanoparticles having different bimetallic ratios are assembled on carbon black support materials and activated by thermal treatment. This approach provides good control of nanoparticle size, composition and/or surface properties. Electrocatalytic MOR activities of the prepared and activated AuPt nanoparticle provided in accordance with the methods of the invention are present in both acidic and alkaline electrolytes.

6 Claims, 18 Drawing Sheets

Figure 3b (1.8 ± 0.6 nm)

METHOD OF SYNTHESIZING AND PROCESSING CARBON-SUPPORTED, GOLD AND GOLD-BASED MULTIMETALLIC NANOPARTICLES FOR USE AS CATALYSTS

RELATED APPLICATIONS

This application is related to co-pending U.S. patent application Ser. No. 11/051,777, filed Feb. 4, 2005 for GOLD-BASED ALLOY NANO-PARTICLES FOR USE AS FUEL CELL CATALYSTS, which is included by reference herein in its entirety.

FIELD OF THE INVENTION

The invention pertains to the synthesis and processing of nanoparticles and, more particularly to the synthesis and processing of carbon-supported, gold and gold-based, highly monodispersed, highly electrocatalytic, monometallic, binary, and ternary nanoparticles.

BACKGROUND OF THE INVENTION

Electrochemical fuel cells convert chemical energy of fuels directly into electrical energy to provide a clean and highly efficient source of electrical energy. Like a battery, a fuel cell consists of two electrodes (an anode and a cathode) separated by an electrolyte typically made of a thin polymeric membrane. In a typical fuel cell, hydrogen gas from the fuel reacts electrochemically at the anode electrode and is converted into protons and electrons. The protons move through the electrolyte to the other electrode (i.e., the cathode), where they combine with the product from the reduction of oxygen from the air to form water, which is expelled from the cell as vapor. The involvement of hydrogen and oxygen in the two reactions, one releasing electrons and the other consuming them, yields electrical energy that is tapped from across the electrodes.

Because of the high conversion efficiencies and low pollution, fuel cells such as hydrogen and direct methanol fuel cells are becoming increasingly attractive power sources for mobile and stationary applications. Such applications include on-board electric power for advanced propulsion systems for non-polluting vehicles. While researchers around the world are developing potential fuel cell applications including electric vehicles and portable electrical power supplies, these developments face challenging scientific problems in the areas of materials science, interfacial science and catalysis. In proton exchange membrane fuel cells (PEMFCs), hydrogen ions must be transported through a semi permeable membrane. Hydrocarbon fuels must first be converted to pure hydrogen by reforming, and the overall conversion requires complex process technology. In addition, substantial investments must be made in safety and controls.

Direct methanol fuel cells (DMFCs) offer a simpler solution and require no reformer. Direct methanol fuel cells are increasingly considered an attractive power source for mobile applications because of the high energy density, the fuel portability, and the easily renewable feature of methanol. The fuel portability of methanol is particularly important in comparison with the difficulties of storing and transporting hydrogen.

In fuel cell reactions, both anode and cathode catalysts are very important for many reasons.

Anode Catalysts:

The readily-obtainable energy density (approximately 2000 Wh/kg) and operating cell voltage (0.4 V) for methanol fuel cells is presently lower than the theoretical energy density (approximately 6000 Wh/kg) and the thermodynamic potential (approximately 1.2 V) for such fuel cells. These problems are largely caused by poor activity of the anode catalysts and "methanol cross-over" to the cathode electrode. These problems account for a loss of about one-third of the available energy at the cathode and another one-third at the anode.

Pt-group metals have been extensively studied for both anode and cathode catalysts, but a major problem is the ease with which they may be poisoned by CO and CO-like intermediate species typically present. Binary PtRu nanoparticle catalysts on carbon supports are currently considered among the most promising catalysts. Binary PtRu catalysts exhibit a bifunctional catalytic mechanism in which Pt provides the main site for the dehydrogenation of methanol and Ru provides the site for hydroxide (OH) and for oxidizing CO-like species to $CO_2$.

Recently, gold at nanoscale sizes was found to exhibit unprecedented catalytic activities, both for CO oxidation and for electrocatalytic activity for CO and methanol oxidation. Studies show that nanoscale gold-based bimetallic materials may provide a synergistic catalytic effect for the methanol oxidation reaction (MOR) at the anode in methanol oxidation fuel cells. For example, the synergistic catalytic effect of gold-platinum (AuPt) nanoparticles might suppress adsorbed poisonous species by changing the electronic band structure to modify the strength of the surface adsorption.

While bimetallic AuPt is a known electrocatalyst for oxygen reduction in alkaline fuel cells, few reports concern utilizing AuPt nanoparticles with controllable size and composition in fuel cell catalyst applications. In such bimetallic systems, Pt could provide the main hydrogenation or dehydrogenation sites, while Au together with Pt could speed up the removal of poisonous species. In the past, decreasing activation energy to facilitate oxidative desorption and suppressing adsorption of CO were believed to lead to sufficiently-high adsorptivity to support catalytic oxidation in alkaline electrolytes. However, it has recently been shown that catalysts prepared by impregnation from Pt and Au precursors provided results similar to those of monometallic Pt catalysts, suggesting that the presence of Au did not significantly affect the catalytic performance of Pt. This is attributed to phase-segregation of the two metals due to their miscibility gap. As such, only Pt participates in the adsorption of CO and the catalytic reaction. How the bimetallic catalytic properties depend on nanoparticle preparation and composition is an important area for the development of new or improved catalysts for fuel cell research.

Cathode Catalysts:

As previously stated, both the energy density and operating cell voltage for direct methanol fuel cells are currently much lower than values that are theoretically possible. At the cathode, the kinetic limitation of the oxygen reduction reaction (ORR) is a problem of interest in proton exchange membrane fuel cells operating at low temperature (<100° C.) and in DMFCs. The rate of breaking O=O bonds to form water strongly depends on the degree of the oxygen interaction with the adsorption sites of the catalyst and competition with other species in the electrolyte (e.g., $CH_3OH$). There is also strong adsorption of OH forming Pt—OH, which causes inhibition of the $O_2$ reduction.

The present inventors have recently investigated gold and gold alloy nanoparticles as potential electrocatalysts fuel cell reactions such as CO and methanol oxidation reactions and oxygen reduction reactions. The exploration of gold nanoparticles in catalysis shows potential applications in fuel cell related catalytic reactions. The nanoparticle surface properties are essential for the adsorption of oxygen and the catalytic reaction of gold at nanoscale sizes. Bimetallic AuPt composition may produce a synergistic catalytic effect that involves the suppression of adsorbed poisonous species and the change in electronic band structure to modify the strength of the surface adsorption for ORR.

The study of AuPt binary and AuPtM ternary nanoparticles with controllable size and composition for fuel cell catalyst applications is important because metal nanoparticles in the size range of approximately 1-10 nm undergo a transition from atomic to metallic properties, and the bimetallic composition could produce synergistic effect. For example, for the adsorption of $(OH^-)_{ads}$ (i.e., $OH^-$ species adsorbed on the catalyst surface) in an alkaline medium the presence of Au in Pt catalysts could reduce the strength of the Pt—OH formation. A full understanding of how the synergistic catalytic effect operates at the nanoscale gold and gold-platinum surface remains elusive. Gold-based binary (AuPt) and ternary (AuPtM) nanoparticles of 1-10 nm core sizes with controllable Au, Pt and a third metal (M), for example, M=W, Ti, Cr, Fe, Mn, etc. have been prepared. These nanoparticles may be assembled onto high surface area carbon nanomaterials with controlled dispersion and loading. The carbon-supported AuPt/C or AuPtM/C nanoparticles are processed by thermal treatment to achieve desired characteristics including size, composition and alloy properties. The electrocatalytic activity of such thermally treated, carbon-supported nanoparticles may be evaluated in both methanol oxidation reactions (MOR) and oxygen reduction reactions (ORR).

The introduction of the third metal component into the binary nanoparticles forms AuPtM ternary nanoparticles. Ternary nanoparticles are expected to lead to several important modifications of the catalytic properties, possibly including further modification of the electronic structure, introduction of an oxide component on the catalyst surface via the propensity of oxide formation of the metal component, and control of the size increase during thermal treatment via alloying with the metal. The relatively low cost of the third component metal should help lower the cost of catalyst materials. Metals such as W, Ti, Pt, Cr, Fe, and Mn, all having melting points higher than Au may be used to prepare AuPtM nanoparticle catalysts. The research is coupled with combinatorial knowledge base for better design of binary and ternary nanoparticles with controllable size, composition and phase properties. The binary/ternary catalysts can be used not only as methanol-tolerant cathode catalysts in fuel cell membrane electrode assemblies (MEAs), but also as CO-tolerant catalysts in combination with the desired oxide support materials for water-gas shift reactions.

SUMMARY OF THE INVENTION

In accordance with the present invention, there is provided a new method of preparing carbon-loaded, gold-based, nanoparticle catalysts. Such catalysts are known to be useful anode catalysts for the electrocatalytic methanol oxidation reaction (MOR) as well as the oxygen reduction reaction (ORR). $Au_mPt_nM_{100-m-n}$ catalysts may be prepared by either a two-phase protocol or by a thermal decomposition/reduction protocol. The prepared nanoparticles are assembled on carbon black support materials and activated by thermal treatment. Nanoparticles having different bimetallic ratios are assembled on carbon black support materials and activated by thermal treatments at different temperatures. This approach provides a better control of nanoparticle size, composition and/or surface properties in comparison with traditional approaches such as co-precipitation, deposition-precipitation, and impregnation. Electrocatalytic MOR activities of the prepared and activated AuPt nanoparticle provided in accordance with the methods of the invention are present in both acidic and alkaline electrolytes.

BRIEF DESCRIPTION OF THE DRAWINGS

A complete understanding of the present invention may be obtained by reference to the accompanying drawings when considered in conjunction with the subsequent detailed description, in which:

FIGS. 3a and 3b are a representative TEM micrograph and a size distribution for $Au_{82}Pt_{18}$ nanoparticles, respectively;

DETAILED DESCRIPTION OF THE PREFERRED EMBODIMENT

The present invention provides new methods of preparing and characterizing gold and gold-based nanoparticles for use as fuel cell catalysts.

Catalyst Preparation and Characterization:

Three different types of nanoparticles were synthesized. First, Au nanoparticles having 2 nm diameter core sizes and encapsulated with an alkanethiolate monolayer shell were synthesized by a standard, two-phase method known to those of skill in the art.

Figure 12:
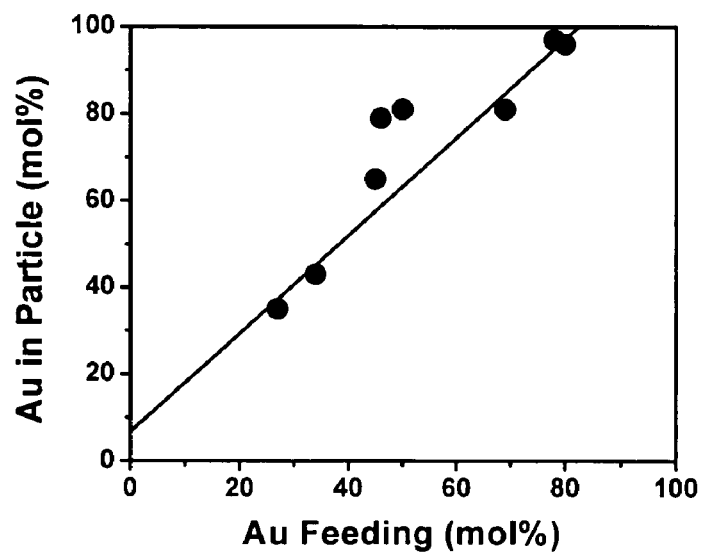
FIG. 12 is a plot of the relationship of Au percentage in the feedstock and the gold percentages in the resulting nanoparticles.

In addition, Au nanoparticles having approximately 2 nm diameter core sizes and encapsulated with an alkanethiolate monolayer shell were synthesized by a modified two-phase method known to those of skill in the art. One such modified, two-phase method used is briefly described. $AuCl_4^-$ and $PtCl_6^{2-}$ are first transferred from aqueous solution of hydrogen tetrachloroaurate ($HAuCl_4$) (0.64 g) and hydrogen hexachloroplatinate (IV) ($H_2PtCl_6$) (0.66 g) into toluene solution using a phase transfer reagent such as tetraoctylammonium bromide. Thiols (1.4 mL decanethiol, DT) and oleylamine (1 mL, OAM) are then added to the organic solution, and an excess of aqueous $NaBH_4$ (2.0 g) is slowly added for the reaction. The produced DT-encapsulated AuPt nanoparticles in toluene are evaporated for removing solvent, and then dissolved in ethanol. After being centrifuged, the precipitated product may be collected and dissolved in hexane. As may be seen in FIG. 12, there is an approximately linear relationship between the percentage of Au in the synthetic feed stock and the percentage of gold in the formed nanoparticles.

Finally, AuPtFe nanoparticles are synthesized using a thermal decomposition/reduction protocol. Briefly, a certain amount of platinum acetylacetonate ($Pt(acac)_2$) and dimethyl (acetylacetonate) gold (III) (($CH_3)_2$ ($C_5H_7O_2$)Au) or gold (III) acetate, $AuCl(SC_4H_8)$ are added to an octyl ether solution containing a reducing agent such as 1,2-hexadecanediol while the solution is stirred. After the solution is heated to 105° C., iron pentacarbonyl ($Fe(CO)_5$) and capping agents (oleylamine and oleic acid) are then added to the solution. The mixture is heated to a temperature greater than 200° C. and refluxed for 30 min. After the reaction mixture is allowed to cool to room temperature, the nanoparticles may be precipitated and cleaned by adding ethanol. The composition of the resulting AuPt and AuPtFe nanoparticles may then be determined using a Direct Current Plasma-Atomic Emission Spectrometer (DCP-AES).

Carbon black XR-72c in the form of approximately 30-50 nm diameter spheres is used as a support for the nanoparticles. A controlled amount of Au or AuPt nanoparticles is added to the suspension of carbon black, which is then sonicated and the mixture is then stirred overnight. The loading of Au or AuPt particles on the carbon supports may be controlled by the weight ratio of Au or AuPt nanoparticles to carbon black. The actual loading of metals may be determined by Thermogravimetric Analysis (TGA) and DCP-AES analysis. Similar protocols may be used for assembling the nanoparticles on silica ($SiO_2$) support materials.

The carbon- or silica-loaded nanoparticle catalysts are next treated in a tube-furnace by heating at approximately 300° C. under 20% $O_2/N_2$ for approximately 1 hour followed by treatment at 400° C. or 500° C. under 15% $H_2/N_2$ for approximately 2 hours. The different results obtained by treating at 400° C. or 500° C. are discussed in detail hereinbelow. While standard temperatures of 400° C. or 500° C. have been used in these studies, it will be recognized that a broad range of treatment temperatures may beneficially be used. Temperatures in the range of between approximately 250° C. and 650° C. appear usable.

Electrode:

Electrodes may be prepared using the following method. Glassy carbon (GC) disks (geometric area: 0.07 $cm^2$ for cyclic voltammetric measurement and 0.20 $cm^2$ for rotating disk electrode measurement) are polished with 0.03 μm $Al_2O_3$ powders to a "mirror" finish. Such electrode preparation techniques are considered known to those of skill in the art and are not further described herein. The geometric area of the substrate electrode (glassy carbon), not the surface area of the catalyst itself, provides a measure of the loading of catalyst on the electrode surface used for the voltammetric characterization. A typical suspension of the catalysts may be prepared by suspending 1 mg of the catalyst in 1 mL of 0.25% Nafion® solution and then sonicating the suspension for approximately 15 minutes. The resulting suspension has been found to remain stable for days. The suspension may then be quantitatively transferred to the surface of the polished GC disks. The electrodes are then typically dried overnight at room temperature.

Measurements:

The cyclic voltammetry and rotating disk electrode measurements are both performed at room temperature. All experiments are performed in three-electrode electrochemical cells. All electrolytic solutions are deaerated with high purity argon or nitrogen before the measurements. All measured potentials are with respect to a reference electrode of Ag/AgCl saturated KCl, which is +0.20 V with respect to a normal hydrogen electrode (NHE) reference. The cyclic voltammetric measurements are performed by using a microcomputer-controlled potentiostat such as an EG&G Instruments/Princeton Applied Research Model 273. The rotating disk electrode (RDE) measurements are performed using a rotating disk electrode measurement system such as Pine Instrument Model AFCBP1.

The composition analysis may be performed using an ARL Fissions Model SS-7 DCP-AES. Measurements are made on emission peaks at 267.59 nm, 265.95 nm, and 259.94 nm for Au, Pt, and Fe, respectively. The nanoparticle samples are first dissolved in concentrated aqua regia, and then diluted to concentrations in the range of 1 to 50 ppm for analysis. Calibration curves are made from dissolved standards with concentrations ranging from 0 to 50 ppm in the same acid matrix as the unknown samples. Detection limits, based on three standard deviations of the background intensity, are 0.008 ppm, 0.02 ppm, and 0.005 ppm for Au, Pt, and Fe. Standard samples and unknown samples were each analyzed 10 times each for 3 second counts. Instrument reproducibility, for concentrations greater than 100 times the detection limit, resulted in errors less than ±2%. For example, DCP analysis of the bimetallic nanoparticles synthesized under a particular condition indicated an atomic composition of 72% Au and 28% Pt. Consequently, the nanoparticles of this particular composition are denoted $Au_{72}Pt_{28}$.

Transmission electron microscopy (TEM) was performed using a Hitachi Model H-7000 electron microscope (100 kV). For TEM measurements, AuPt, AuPt/C, or AuPtFe/C samples were suspended in a hexane solution and were drop cast onto a carbon-coated copper grid followed by solvent evaporation in air at room temperature.

Thermogravimetric analysis (TGA) for determining the metal loading on carbon black was performed on a Perkin-Elmer Model Pyris 1-TGA. Typical samples weighed approximately 4 mg and were heated in a platinum pan. Samples were heated in 20% $O_2$ at a rate of approximately 10° C./min.

The thermally treated nanoparticles were examined by powder X-ray diffraction (XRD). Powder diffraction patterns were recorded on a Scintag Model XDS 2000 θ-θ powder diffractometer equipped with a Ge(Li) solid state detector (CuK. radiation). The data were collected from 10° to 90° 2θ at a scan rate of 0.02° 2θ per step and 30 seconds per point.

Results:

Referring first to FIGS. 1a-1d, there are shown TEM micrographs of 2 nm Au nanoparticles, $Au_{2-nm}/C$ assembled nanoparticles before thermal treatment, and $Au_{2-nm}/C$ nanoparticle treated at 250° C. and 300° C., respectively.

Figure 1A:
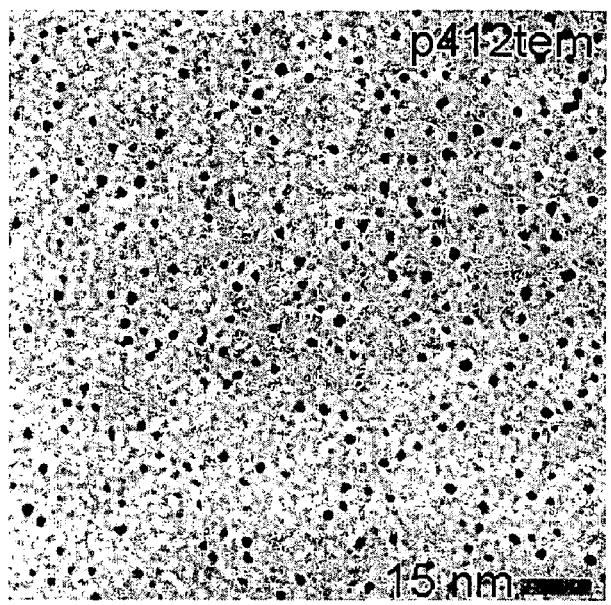
FIG. 1a is a TEM micrograph of approximately 2 nm diameter Au nanoparticles.
Figure 1B:
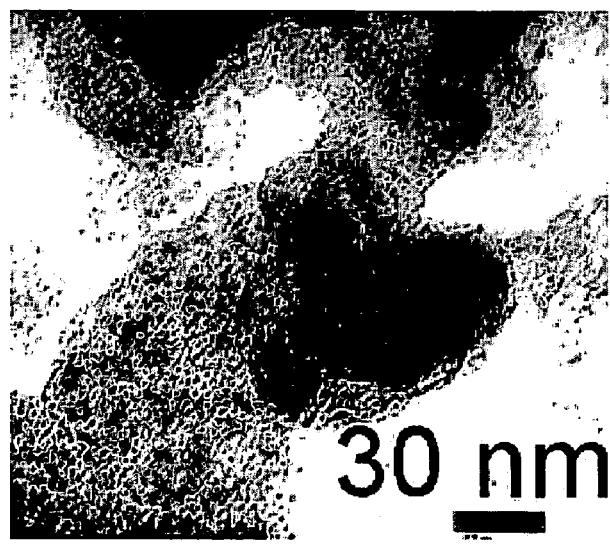
FIG. 1b is a TEM micrograph of approximately 2 nm diameter Au/C nanoparticles.
Figure 1C:
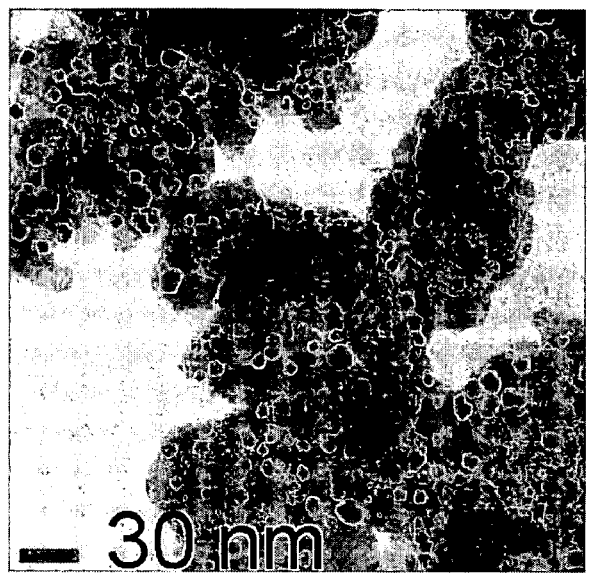
FIGS. 1c and 1d are TEM micrographs of the Au/C nanoparticles of FIG. 1b treated at 250° C. and 300° C., respectively.
Figure 1D:
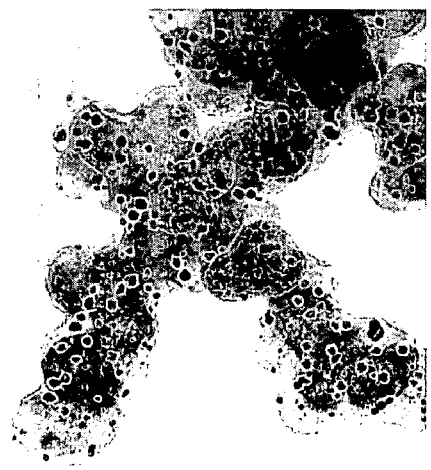
Figure 2A:
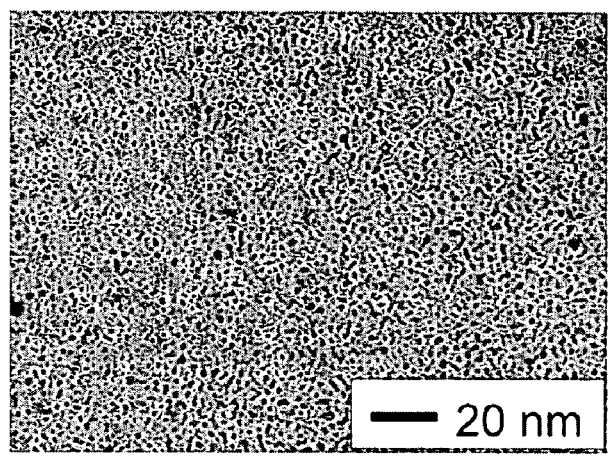
FIGS. 2a and 2b are a representative TEM micrograph and a size distribution for $Au_{72}Pt_{28}$ nanoparticles, respectively.
Figure 2B:
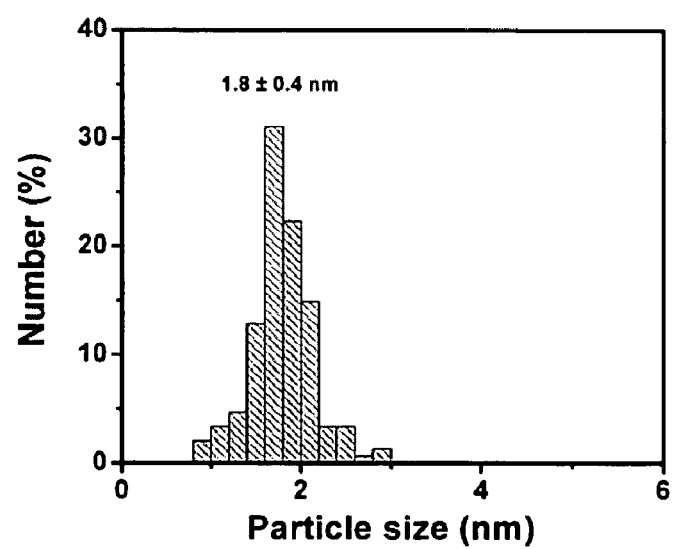
Figure 2C:
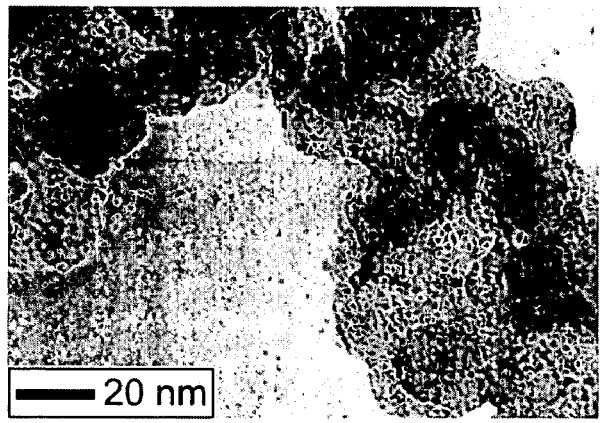
FIG. 2c is a TEM micrograph showing $Au_{72}Pt_{28}$ nanoparticles assembled onto carbon black.

Referring now to FIGS. 2a and 2b, there are shown a representative TEM micrograph and a size distribution for $Au_{72}Pt_2$, nanoparticles, respectively. The relatively uniform inter-particle spacing (FIG. 2a) shows that the particles are individually-isolated by their capping monolayers. This conclusion is also supported by FTIR detection of vibrational bands characteristic of the capping molecules. The nanoparticles displayed an average size of 1.8 nm with a relatively size monodispersity (±0.4 nm) (FIG. 2b). The $Au_{72}Pt_{28}$ nanoparticles, when assembled onto carbon black, also showed a very good dispersion, and the average size of the particles showed little change. This may be seen in FIG. 2c. The capping or linking shells remain intact and are responsible for the interaction with the carbon surfaces.

As stated hereinabove, the thermal treatment involved heating the catalyst at 300° C. under 20% $O_2$ followed by treatment at 400° C. or 500° C. in 15% $H_2$. After the thermal treatment of the carbon-loaded catalysts, the average particle size was found to increase. The size increase appears to be dependent upon the treatment temperature.

Figure 2D:
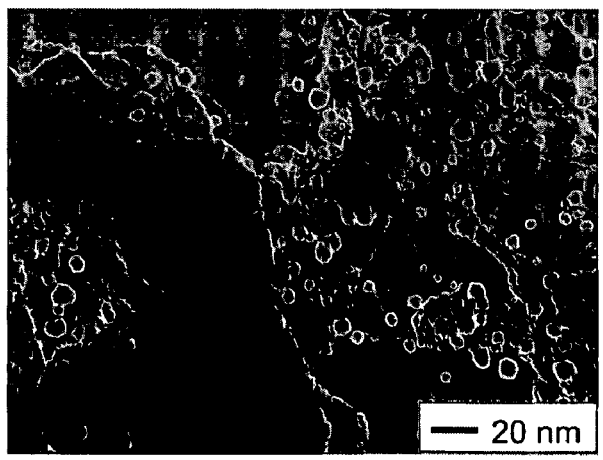
FIGS. 2d and 2e show TEM micrographs of $Au_{72}Pt_{28}/C$ nanoparticles treated at 400° C. and 500° C., respectively.
Figure 2E:
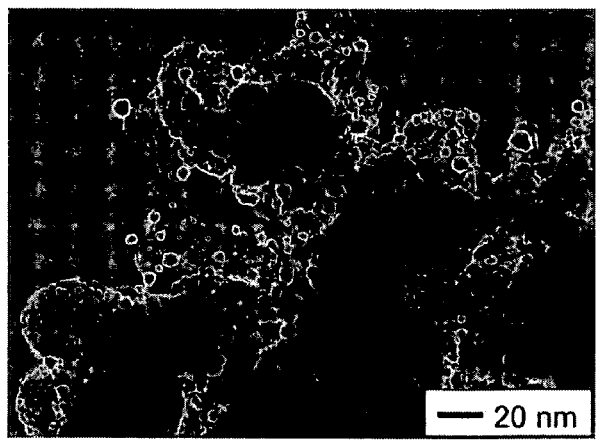

Referring now to FIGS. 2d-2e, there are shown TEM micrographs of $Au_{72}Pt_{28}$ nanoparticles treated at 400° C. and 500° C., respectively. The average size of $Au_{72}Pt_{28}$ nanoparticles increased to 4.6±1.0 nm after treatment at 400° C. (FIG. 2d) and to 4.6±1.2 nm after treatment at 500° C. (FIG. 2e).

Figure 3A:
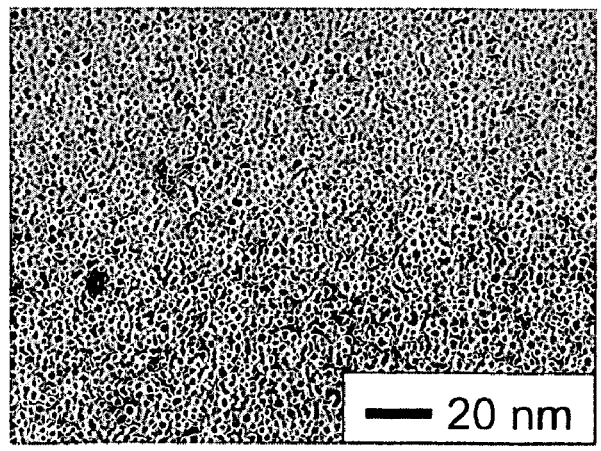
Figure 3C:
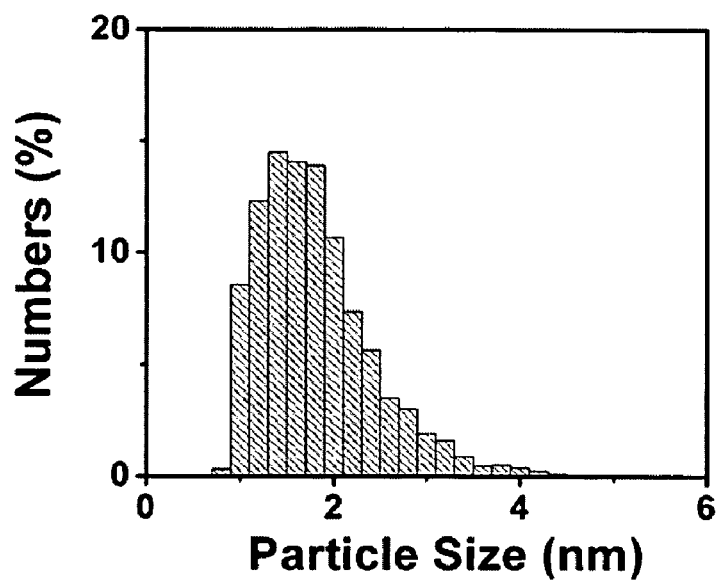
FIG. 3c is a TEM micrograph showing $Au_{82}Pt_{18}$ nanoparticles assembled onto carbon black.
Figure 3C:
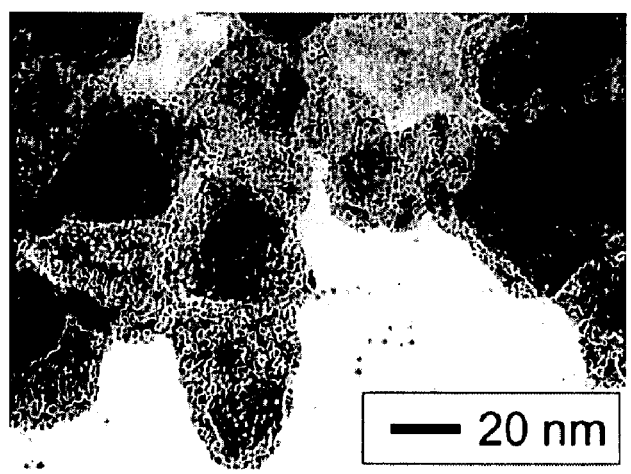

Referring now to FIGS. 3a and 3b, there are shown a representative TEM micrograph and a size distribution for $Au_{82}Pt_{18}$ nanoparticles, respectively. The relatively uniform inter-particle spacing (FIG. 3a) shows that the particles are individually-isolated by their capping monolayers. This conclusion is also supported by FTIR detection of vibrational bands characteristic of the capping molecules. The nanoparticles displayed an average size of 1.8 nm with a relatively size monodispersity (±0.6 nm) (FIG. 3b). The $Au_{82}Pt_{18}$ nanoparticles, when assembled onto carbon black, also showed a very good dispersion, and the average size of the particles showed little change. This may be seen in FIG. 3c. The capping or linking shells remain intact and are responsible for the interaction with the carbon surfaces.

Figure 3D:
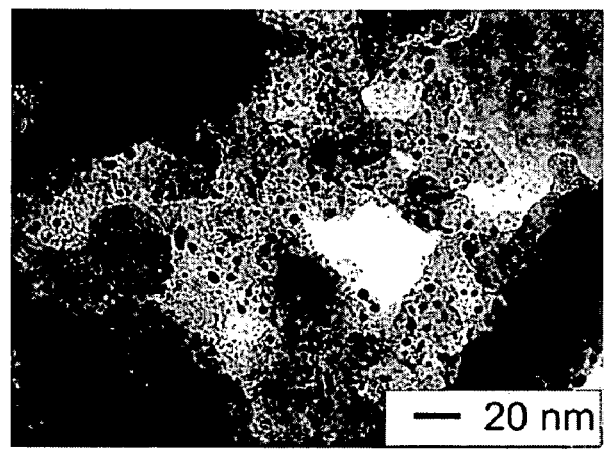
FIGS. 3d and 3e show TEM micrographs of $Au_{82}Pt_{18}/C$ nanoparticles treated at 400° C. and 500° C., respectively.
Figure 3E:
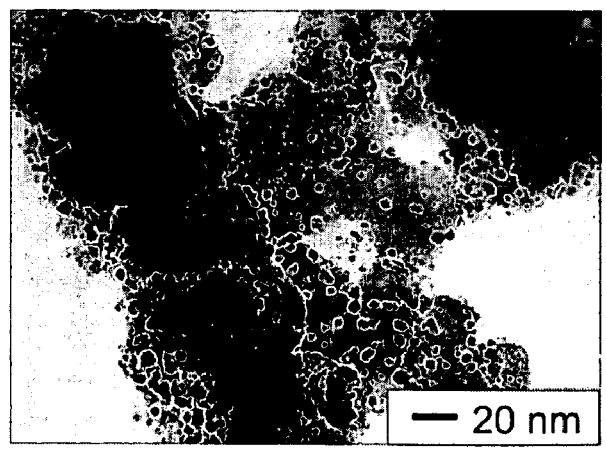

FIGS. 3d-3e are TEM micrographs of $Au_{82}Pt_{18}$ nanoparticles on carbon support after thermal treatment at 400° C. and 500° C., respectively. The average size of $Au_{82}Pt_{18}$ nanoparticles increased to 3.3±1.1 nm and to 3.9±1.1 nm after the treatments at 400° C. and 500° C., respectively. It is believed that local mobility of the shell-removed nanoparticles on carbon surface is responsible for the size increase.

Figure 3F:
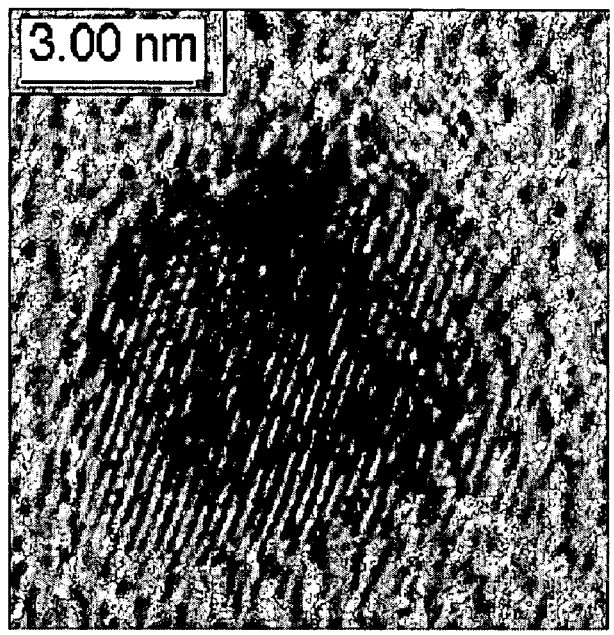
FIG. 3f is a high-resolution TEM micrograph of a single one of the $Au_{82}Pt_{18}/C$ nanoparticles of FIG. 3e.

FIG. 3f is a high resolution TEM micrograph of a single nanoparticle as seen in FIG. 3e.

Figure 4:
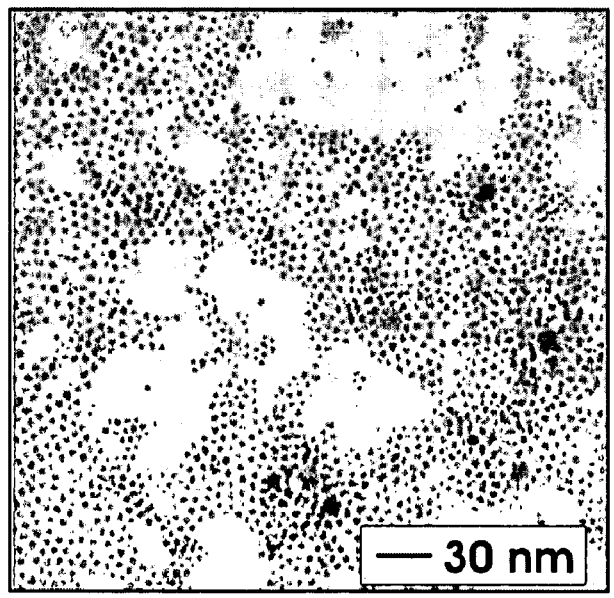
FIG. 4 is a representative TEM micrograph for $Au_{11}Pt_{23}Fe_{66}$ nanoparticles.

Referring now to FIG. 4, there is shown a TEM micrograph of $Au_{11}Pt_{23}Fe_{66}$ nanoparticle catalyst.

The effective removal of the capping agents may be verified by both FTIR and XPS analyses of the catalyst. After successful removal of the capping agents, the vibrational bands characteristic of the capping molecules in the C—H stretching region are no longer detected by FTIR. XPS analysis also shows that the bands associated with sulfur species are absent after successful thermal treatment.

Thermally treated AuPt bimetallic nanoparticles may be analyzed using XRD techniques. It is believed that the ability to control the composition and phase properties of bimetallic nanoparticles is critical to their future use as catalysts. The bimetallic nanoparticles formed in accordance with the inventive method display alloy properties. This is very different from the bimetallic miscibility gap generally seen in the bulk counterparts of the bimetallic metals. This finding demonstrates the difference between both the physical and chemical properties of nanoscale materials compared with the properties of the same materials in a bulk, crystalline state. Important details of the phase properties of the bimetallic nanoparticle catalysts and new information correlation between the nanoparticle composition and the phase properties of that material at the nanoscale have also been discovered.

Figure 5:
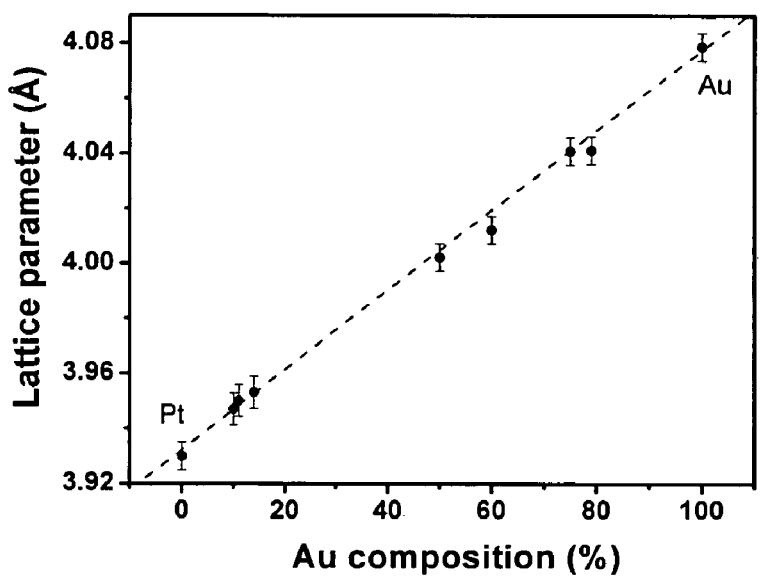
FIG. 5 is a graph of lattice structure parameters for $Au_mPt_{100-m}/C$ nanoparticles vs. percentage of Au in the composition.

Referring now to FIG. 5, there is shown graph of lattice structure parameters for $Au_mPt_{100-m}/C$ nanoparticles vs. percentage of Au in the composition. As may be seen, there is an approximately linear fit to the experimental data.

The lattice parameters of several AuPt nanoparticles scale linearly with the relative Au/Pt content (i.e., follow a Vegard's type law typically observed with binary metallic alloys). The correlation between the phase type and the bimetallic composition at the nanoscale therefore is different from bimetallic composition counterparts. The bulk counterparts typically display a miscibility gap manifested by a break in the linear correlation between the lattice parameter and the composition at approximately 10-80% Au. Within the miscibility gap, the lattice parameters of bulk AuPt are independent of the composition.

Understanding the surface properties of gold-based alloy nanoparticles is believed essential to exploiting their unique catalytic properties. To probe these properties, FTIR was used to investigate CO adsorption on the surface of silica-supported gold-platinum nanoparticles. The nanoparticles were assembled on silica supporting materials, and treated at controlled conditions. By comparing the spectroscopic characteristics with those of the monometallic nanoparticle counterparts, the CO stretching bands for the adsorption on the bimetallic nanoparticle catalysts may be seen to fall distinctively between those for the monometallic Au and Pt nanoparticle catalysts. This verifies the surface alloy character of the bimetallic nanoparticle catalysts. These new insights into the correlation between the bimetallic composition and the surface binding properties and their implications to the design of gold-based bimetallic nanoparticle catalysts are discussed in detail hereinbelow.

One important question is whether the surface metal distribution is different from the composition in the multimetallic nanocrystals. If it is different, it is important to understand how the surface binding sites impact the surface adsorption or catalytic activity. To answer these questions, CO is used as an in situ FTIR probe because the stretching band for the adsorption of CO on nanocrystal surfaces is highly sensitive to surface binding sites in terms of composition and geometry. FIG. 6 shows a set of data. For Au/SiO$_2$ (FIG. 6a-6b), the detection of the peak at 2129 cm$^{-1}$ is consistent with literature reports. However, the spectral difference due to treatment temperatures demonstrated that the surface properties for Au catalysts is highly dependent on the thermal treatment. While traces of contaminants may exist in silica treated in the same manner, the observed signals are approximately one order of magnitude lower than those of the catalyst and do not significantly contribute to the detected bands.

Figure 6A:
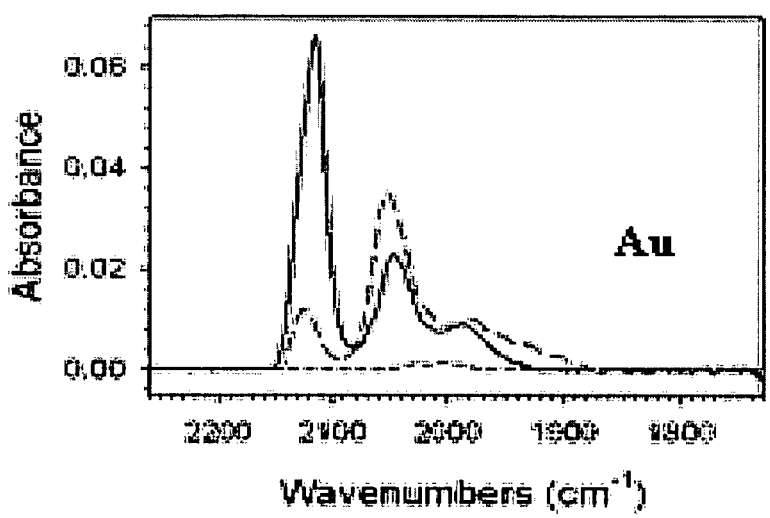
FIG. 6a is a plot of FTIR spectra of CO adsorption for $Au/SiO_2$ treated at 200 (black), 400° C. (red), and $SiO_2$ blank (blue) (Spectra were collected in the presence of 4% CO in $N_2$)
Figure 6B:
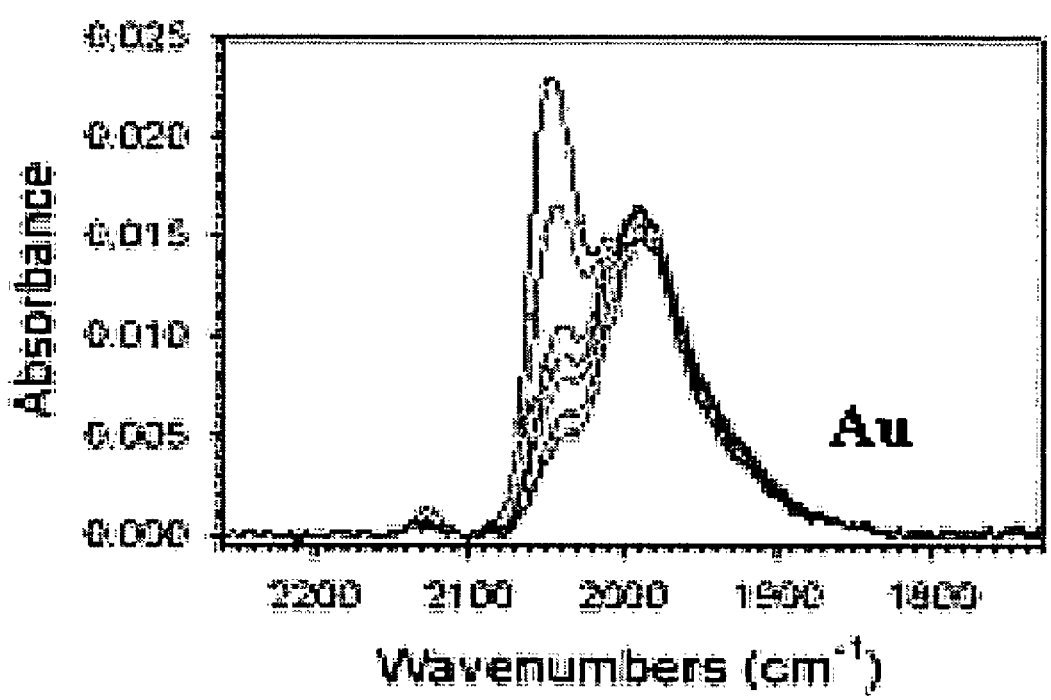
FIG. 6b is a plot of FTIR spectra of CO adsorption for $Au/SiO_2$ treated at 200 (black), 400° C. (red), and $SiO_2$ blank (blue) (Spectra were collected in the pure $N_2$ following purging CO away)
Figure 6C:
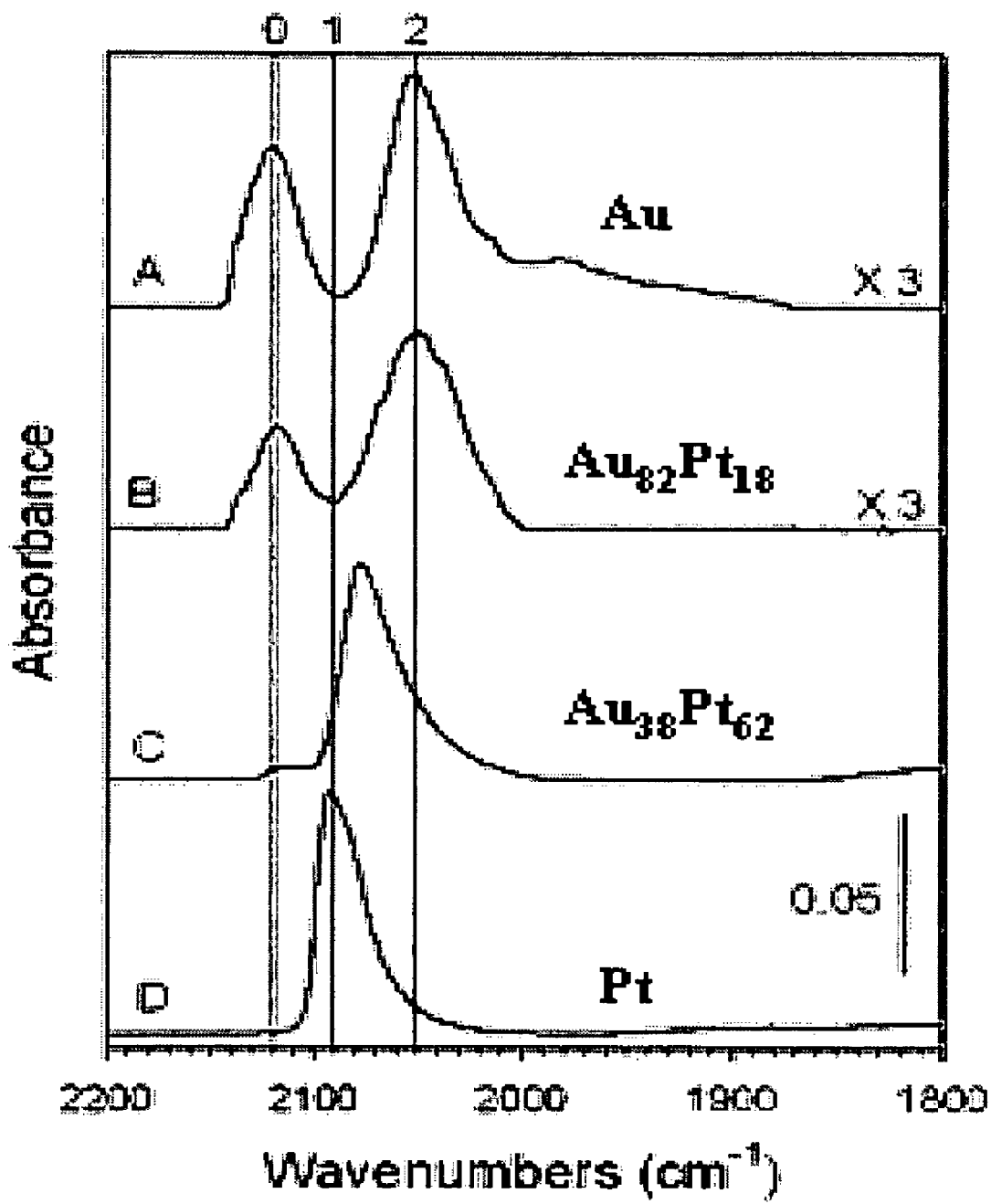
FIG. 6c is a plot of FTIR spectra of CO adsorption for $Pt/SiO_2$, $Au/SiO_2$, & $Au_nPt_{100-n}/SiO_2$ with 4% CO.
Figure 6D:
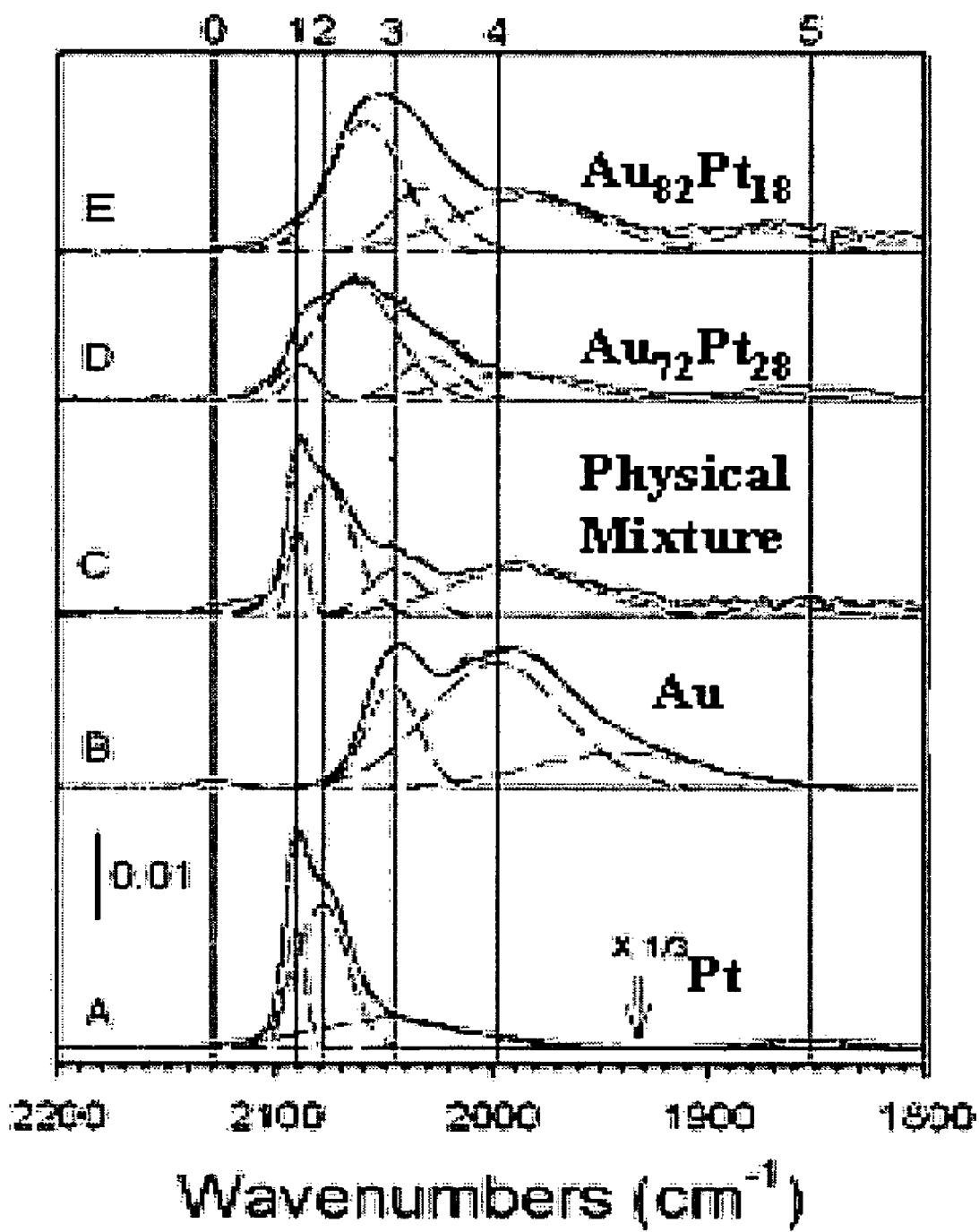
FIG. 6d is a plot of FTIR spectra of CO adsorption for $Pt/SiO_2$, $Au/SiO_2$, & $Au_nPt_{100-n}/SiO_2$ with pure $N_2$. Solid lines: experimental data. Dash lines: spectral deconvolution.

In contrast to the features characteristic of the monometallic Au and physical mixture of Au and Pt, the CO band for AuPt alloys is unique and falls in between those for the two monometallic catalysts (FIGS. 6c-6d). As may readily be seen, the 2129 cm$^{-1}$ band is greatly diminished. The surface binding sites on the bimetallic nanoparticles are clearly modified as a result of the surface alloying of the two components. An apparent red shift of approximately 15 cm$^{-1}$ with increasing treatment temperature was also detected. This probably indicates a re-distribution of the relative bimetallic composition on the nanocrystal's surface, leading to a surface enrichment of Au. The absence of phased-segregation for the bimetallic Au$_{72}$Pt$_{28}$ and Au$_{82}$Pt$_{18}$ catalysts, as demonstrated by the XRD data, substantiates the effectiveness of the novel preparation method of the present invention when compared to data reported for CO adsorption on dendrimer-derived gold-platinum nanoparticles.

In addition, X-ray Photoelectron Spectroscopy (XPS) is utilized to probe the relative composition in the multimetallic nanoparticles upon the thermal treatment, and to determine composition and relative surface enrichment of a specific element. The results from XPS studies of AuPt and AuAg alloy nanoparticles have demonstrated the viability of detecting the relative change of the bimetallic composition, and more importantly, the effective removal of the capping materials. For example, no sulfur was detected for the AuPt/SiO$_2$ sample treated at 400° C.

TABLE 1

Comparison of CO bands on monometallic and bimetallic catalysts.

| Sample (on SiO$_2$) | Peak Position (cm$^{-1}$) | | | | | |
|---|---|---|---|---|---|---|
| | 0 | 1 | 2 | 3 | 4 | 5 |
| Au (400° C.) | 2129 | | | 2047 | 1999 | 1942 |
| Au (500° C.) | 2129 | | | 2042 | 1988 | 1901 |
| Pt (400° C.) | | 2091 | 2079 (sh) | 2049 | | 1854 |
| mixed Au/ & Pt/SiO$_2$ (400° C.) | | 2091 | 2078 (sh) | 2045 | 1989 | 1866 |
| Au$_{72}$Pt$_{28}$ (400° C.) | | 2088 (sh) | 2065 | 2030 (sh) | 1990 (sh) | 1867 |
| Au$_{72}$Pt$_{28}$ (500° C.) | | | 2067 | 2035 (sh) | 1996 (sh) | 1877 |
| Au$_{82}$Pt$_{18}$ (400° C.) | | 2098 (sh) | 2054 | 2027 (sh) | 2001 (sh) | 1879 |
| Au$_{82}$Pt$_{18}$ (500° C.) | | | 2057 (sh) | 2033 | 1988 (sh) | 1887 |

Note: Bold numbers indicate primary peaks, (sh) for shoulder band.

As may be seen from both the plots of FIG. 6d and the data of Table 1, physically-mixed Au/SiO$_2$ and Pt/SiO$_2$ (FIG. 6d, plots B and A, respectively) catalysts showed features characteristic of monometallic catalysts as shown by peaks of 0, 1, 2, 3, 4, and 5 in their respective plots. However, thermally treated AuPt catalysts have bimetallic alloy characteristics at the surface as may been seen by the fact that the peaks are falling in between peaks 2 and 3. This result is due to the fact that the CO band is unique and falls between those for the two monometallic catalysts.

Overall, the CO adsorption bands for the bimetallic AuPt catalysts fall between the two monometallic catalysts. This result is quite different from prior art findings regarding CO adsorption on AuPt catalysts prepared in accordance with a dendrimer-based synthesis protocol. CO adsorption bands from nanoparticles so prepared fell within the bulk miscibility gap.

The bimetallic Au$_{72}$Pt$_{28}$ and Au$_{82}$Pt$_{18}$ catalysts show other alloy properties, not properties of phased-segregated metals. This is in agreement with the observed XRD data.

The adsorption of CO on the silica-supported bimetallic AuPt nanoparticle catalysts displays CO stretching bands which fall distinctively between those observed for silica-supported monometallic Au and Pt nanoparticle catalysts. The detection of such CO bands demonstrates that the CO binding properties of the bimetallic nanocrystal's surface are highly dependent on the bimetallic composition, the treatment temperature, and other preparation conditions. These findings further substantiate the alloy character of the surface binding sites of the bimetallic nanoparticle catalysts prepared in accordance with the inventive method.

The electrocatalytic activity of the carbon-supported catalysts loaded on glassy carbon electrode is characterized for both MOR and ORR, in both acidic and alkaline electrolytes. Some examples are provided.

The electrocatalytic activity of the Au$_{82}$Pt$_{18}$/C catalysts loaded on glassy carbon electrode was characterized for a MOR reaction in both acidic and alkaline electrolytes. While the results from the acidic electrolyte show relatively low electrocatalytic activity, significant electrocatalytic activity may be observed in an alkaline electrolyte.

Figure 7A:
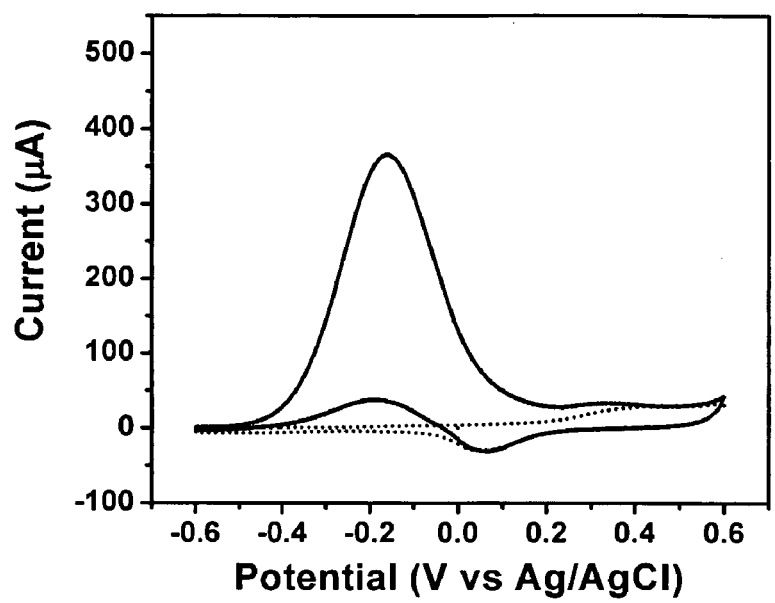
FIGS. 7a and 7b are typical sets of cyclic-voltammetric (CV) curves obtained for a MOR in alkaline electrolyte (solid lines: with methanol; dot lines: without methanol) on $Au_{82}Pt_{18}/C$ catalysts (20% metals loading) at treatment temperatures of 400° C. and 500° C., respectively.
Figure 7B:
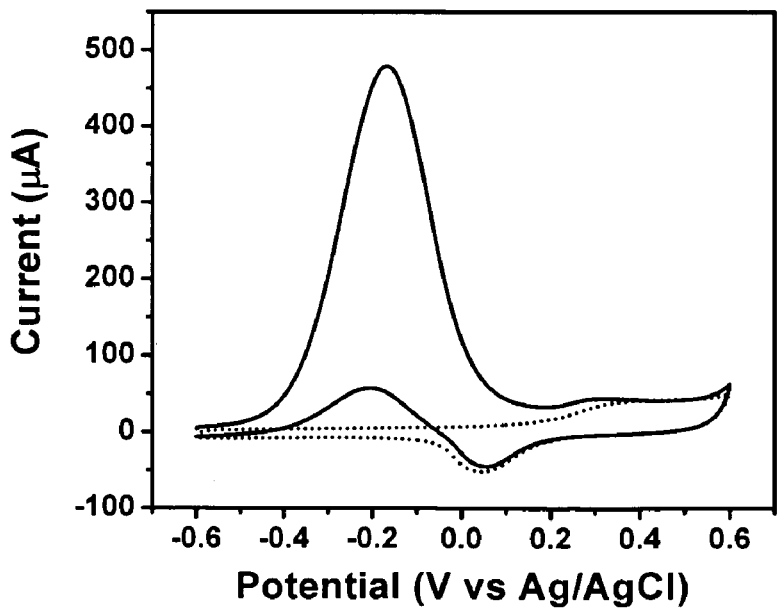

Referring now to FIGS. 7a and 7b, there are shown two typical sets of cyclic-voltammetric (CV) curves obtained for MOR in alkaline electrolyte on Au$_{82}$Pt$_{18}$/C catalysts (20% metals loading). The catalysts were treated at two different treatment temperatures, 400° C. (FIG. 7a) and 500° C. (FIG. 7b). Measurements were performed with the catalyst on a 0.07 cm$^2$ GC electrode, at a scan rate of 50 mV/s, and 0.5M KOH electrolyte. Measurements were made with 0.5 M methanol (solid curves) and without methanol (dashed curves). All data is with reference to an Ag/AgCl reference electrode.

The peak potentials and peak currents provided measures of the electrocatalytic activity are summarized in Table 2.

TABLE 2

Comparison of peak potential ($E_{pa}$) and peak current ($i_{pa}$) for MOR at $AU_{82}Pt_{18}/C$ catalysts.

| Metal | Treatment | Activity in 0.5 M KOH | |
| --- | --- | --- | --- |
| loading Wt % | temperature ° C. | $E_{pa}$ (mV) | $i_{pa}$ (mA/cm$^2$/mg Metal) |
| 20% | 400 | −160 | 6518 |
| 20% | 500 | −171 | 8536 |

Electrode coverage, 57 µg (metals/C)/cm$^2$. Concentration of methanol: 0.5 M; Electrode area: 0.07 cm$^2$; Scan rate: 50 mV/s; Ref electrode: Ag/AgCl, Saturated KCl.

In the absence of the methanol in the electrolyte, both catalysts (FIGS. 7a, 7b) exhibit redox waves corresponding to gold and gold oxide on the surface. The gold oxidization wave was found at approximately 0.3 V whereas the reduction wave was located at approximately 0.06-0.07 V for both catalysts. There seems to be a subtle difference in the redox current, which is perhaps suggestive of surface composition differences. The $Au_{82}Pt_{18}/C$ catalysts treated at 500° C. showed larger redox currents for gold than those treated at 400° C. In comparison with the data from the above control experiment (dashed lines), a large anodic wave appears at −0.16 V or at approximately −0.17 V for catalysts treated at 400° C. (FIG. 7a) and 500° C. (FIG. 7b), respectively, in the presence of methanol. This anodic wave corresponds to the electrocatalytic oxidation of methanol.

FIGS. 8a-8d show representative sets of CV curves comparing the electrocatalytic MOR characteristics of Pt/C (E-Tek), PtRu/C (E-Tek), $Au_{82}Pt_{18}/C$, and Au/C catalysts, respectively, on 0.07 cm$^2$ GC electrodes, in 0.5M KOH with 0.5 M methanol (solid curves), and without methanol (dashed curves). All data were obtained with 20% metal loading and the scan rate was 50 mV/s.

Figure 8A:
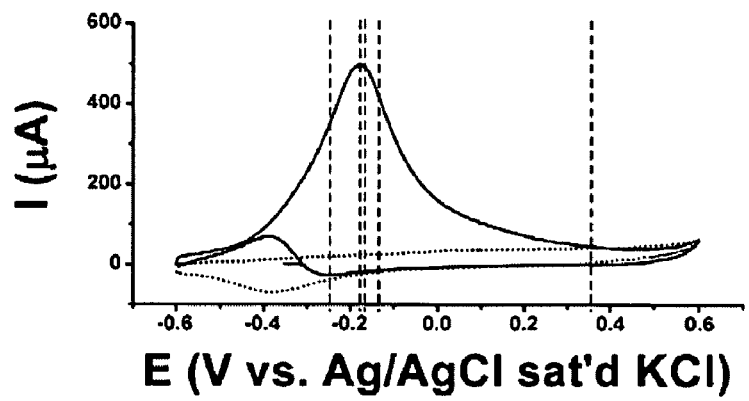
FIGS. 8a-8d are representative sets of CV curves comparing the electrocatalytic MOR characteristics of Pt/C, PtRu/C, $Au_{82}Pt_{18}/C$, and Au/C catalysts in 0.5M KOH with (solid lines) and without (dot lines) 0.5 M methanol.
Figure 8B:
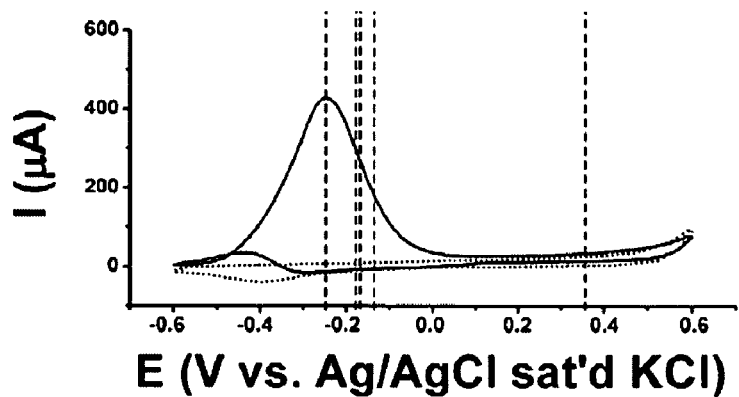
Figure 8C:
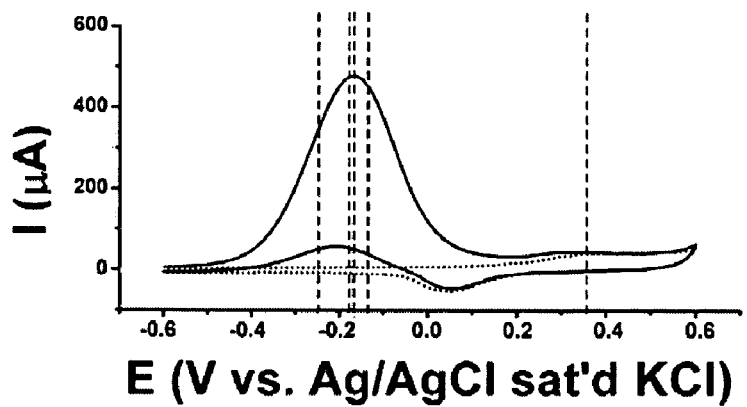
Figure 8D:
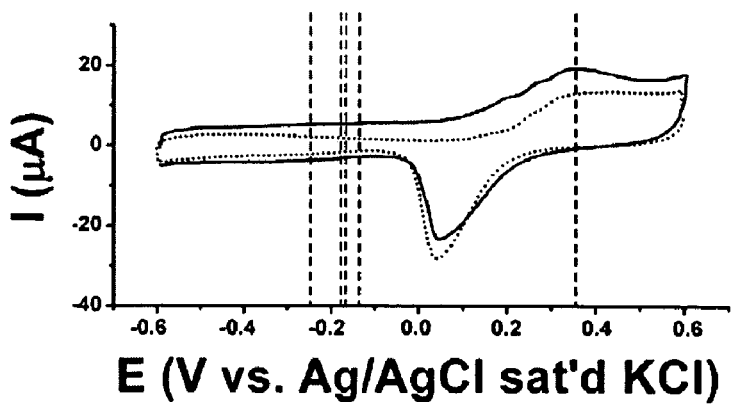

As may be seen in FIGS. 8a-8d, the peak potentials of the $Au_{82}Pt_{18}/C$ catalysts (FIG. 8c) are more negative than those for a monometallic Au catalyst Au/C (FIG. 8d).

As may be seen in FIGS. 7a and 7b, the magnitude of the anodic current for the AuPt/C treated at 500° C. is greater than that treated at 400° C. Furthermore, a smaller anodic wave is observed at approximately −20 mV on the reverse sweep for the AuPt/C catalysts. This anodic wave is believed to be attributable to the oxidation of methanol on a re-activated catalyst surface. For the comparison, 20% Au/C, 20% AuPt/C, 20% Pt/C and 20% PtRu/C were studied under the same conditions. The catalyst thin films on the GC electrode were also prepared under the same conditions.

It is evident that the general electrocatalytic characteristic for AuPt/C catalysts is quite similar to those observed for the Pt/C and PtRu/C catalysts. By comparing peak potentials and peak currents, it can be seen that the peak potential for AuPt/C catalysts is higher by approximately 10-20 mV compared to Pt/C and by approximately 80-100 mV compared to PtRu/C. The peak current density of the AuPt/C catalyst, after being normalized to the total metal loading, is larger than that for PtRu/C catalyst and slightly smaller than Pt/C catalyst. This observation indicates that there is a major improvement in comparison with that of Au/C catalysts in terms of the peak potential (by approximately −600 mV) and the peak current (by approximately 25×). The presence of a small fraction of Pt in the Au-based bimetallic nanoparticles significantly modifies the catalytic properties thereof.

The catalytic modification of the bimetallic composition is, in fact, further supported by the remarkable difference in the voltammetric characteristics observed in the reverse scan, especially in the alkaline electrolyte. For Pt/C and PtRu/C, the reverse wave for alkaline electrolyte occurs at a potential less positive than the forward wave by approximately 200 mV. In contrast, the reverse wave for AuPt/C occurs at a potential which differs from the potential for the wave in the forward sweep by only approximately 20 mV. The relative peak current of the reverse/forward wave is also found to be dependent on the percentage of Au in the bimetallic nanoparticles. The oxides formed on the catalyst surface at the potential beyond the anodic peak potential in the positive sweep are reduced in the reverse sweep. Poisonous CO species formed on the Pt surfaces may also be removed in the reversed sweep. The observation of the more positive potential for the reverse wave is believed to reflect the bimetallic effect on the re-activation of the catalyst surface after the anodic sweep. The re-activation of the surface catalytic sites after the anodic sweep is likely modified by the presence of Au in the catalyst. The presence of Au shifts the peak potential of the reverse wave to a more positive potential by approximately 200 mV for AuPt/C compared to the Pt/C catalyst.

Depending on the relative Pt concentration in the bimetallic nanoparticles, features that are characteristic of hydrogen adsorption waves and hydrogen evolution current may also be seen. These features are characteristic of the Pt component in the approximately −0.2 V to 0.1 V potential range. These characteristics are also modified by the presence of Au component. This finding supports the fact that the bimetallic composition of the AuPt nanoparticles is operative in electrocatalytic reactions.

The electrocatalytic activity of the catalysts loaded on glassy carbon electrode was also characterized for ORR reaction in both acidic and alkaline electrolytes.

The electrocatalytic properties of carbon-supported Au nanoparticles Au/C is discussed in copending U.S. patent application Ser. No. 11/051,777. With regard to the ORR, an Au/C catalyst (17% wt metal) in 0.5 M KOH and 0.5 M $H_2SO_4$ electrolytes saturated with $O_2$ shows a large cathodic wave in its CV data. This cathodic wave is approximately −150 mV in the alkaline electrolyte and +50 mV in the acidic electrolyte. This is attributable to electrocatalytic $O_2$ reduction. To evaluate the electrocatalytic properties, rotating disk electrode (RDE) experiments were performed to determine the number of electrons transferred in the electrocatalytic ORR process.

Based on CV data for ORR an Au/C catalyst (17% by weight metal) in 0.5 M KOH and 0.5 M $H_2SO_4$ electrolytes saturated with $O_2$, large cathodic waves are observed at −150 mV in the alkaline electrolyte and at +50 mV in the acidic electrolyte. The waves are attributable to electrocatalytic $O_2$ reduction. To evaluate the electrocatalytic properties, rotating disk electrode (RDE) experiments were performed to determine the number of electrons transferred in the electrocatalytic ORR process. Based on Levich plots of the limiting current vs. rotating speed, an electron transfer number (n) was derived. A value of n=2.4 was obtained for ORR in 0.5M KOH electrolyte, and 2.2 for ORR in 0.5M $H_2SO_4$ electrolyte. The fact that the n values fall between 2 and 4 indicates that the electrocatalytic ORR at the Au/C catalyst likely involved mixed 2e$^-$ and 4e$^-$ reduction processes.

Figure 9A:
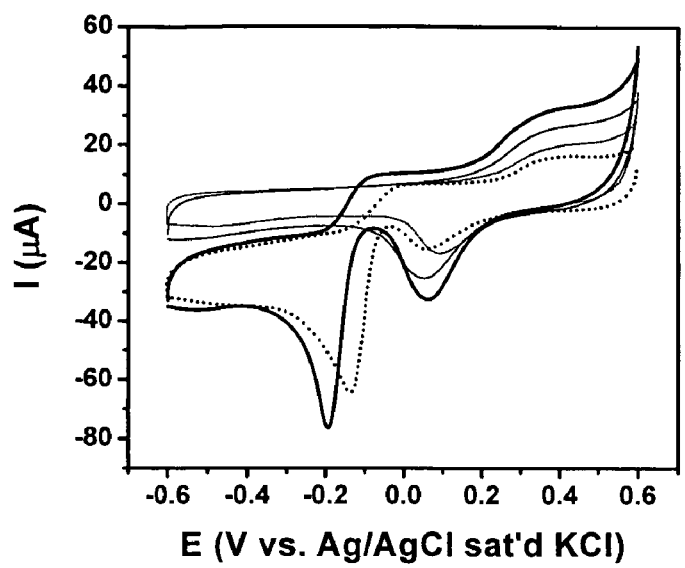
FIG. 9a is a typical CV curve for $Au_{72}Pt_{28}/C$ catalysts treated at, 400° C. (dot lines) and 500° C. (solid lines), in 0.5 M KOH saturated with O2 (thick curves) and Ar (thin curves)
Figure 9B:
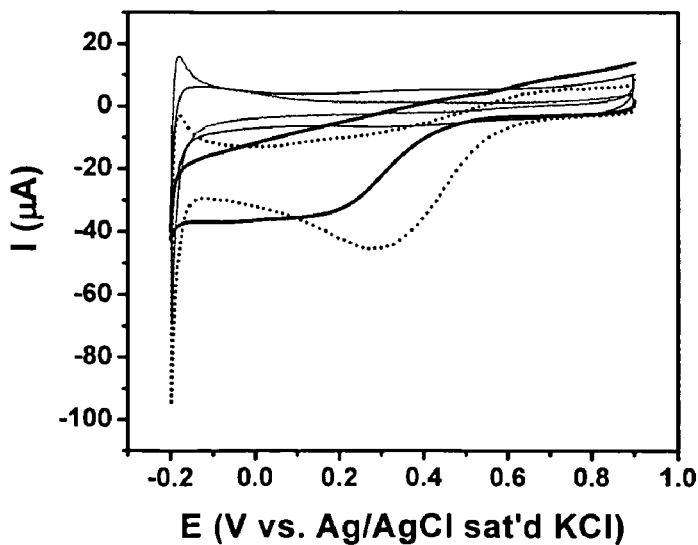
FIG. 9b is a typical CV curves for $Au_{72}Pt_{28}$/C catalysts treated at 400° C. (dot lines) and 500° C. (solid lines), in 0.5 M $H_2SO_4$ saturated with O2 (thick curves) and Ar (thin curves)

Referring now to FIGS. 9a and 9b, there are shown typical sets of CV curves for $Au_{72}Pt_{28}/C$ catalysts treated at 400° C. and 500° C., respectively. Data are provided for both alkaline and acidic electrolytes. Two important pieces of evidence support the presence of both Au and Pt on the surface of the nanoparticle catalyst. First, the oxidation-reduction wave of gold oxide at approximately 200 mV at the $Au_{72}Pt_{28}/C$ catalyst in the $O_2$-free alkaline electrolyte (FIG. 9a) is a clear indication of the presence of Au on the catalyst surface. Second, the hydrogen reduction-oxidation currents at −200 mV in the $O_2$-free acidic electrolyte (FIG. 9b) is characteristic of hydrogen adsorption and reduction at Pt electrodes, provides strong evidence of the presence of Pt on the catalyst surface.

The observation that the $Au_{72}Pt_{28}$/C catalyst treated at 500° C. displays more features characteristic of Au redox reaction than the $Au_{72}Pt_{28}$/C catalyst treated at 400° C. is indicative of the differences in surface bimetallic composition. These differences suggest that there is a significant fraction of Au on the bimetallic catalyst which keeps the nanoscale gold property unchanged in a basic electrolyte, but modifies the catalytic property of Pt in an acidic electrolyte.

From RDE data obtained for an ORR with an $Au_{72}Pt_{28}$/C catalyst treated at 400° C. and Levich plots, the value for the electron transfer number (n) may be derived. The results showed that n=3.1±0.4 in 0.5 M KOH and 2.9±0.4 in 0.5 M $H_2SO_4$. For the same $Au_{72}Pt_{28}$/C catalyst treated at 500° C., n=2.5±0.4 in 0.5 M $H_2SO_4$ and 2.6 in 0.5 M $H_2SO_4$. There is a noticeable increase in the n value for the bimetallic AuPt/C catalyst treated at 400° C. in comparison with that for the monometallic Au/C catalyst. For the $Au_{72}Pt_{28}$/C catalyst treated at 500° C., the results show n=3.0 in 0.5 M KOH and 3.1 in 0.5 M $H_2SO_4$ for an ORR. These values are somewhat larger than those obtained for an Au/C catalyst. Again, the $Au_{72}Pt_{28}$/C catalyst treated at 500° C. seems to display more features characteristic of Au.

The electrochemical data for Au/C (20% metals) and AuPt/C catalysts (20% metals) were compared with those obtained from characterizations of commercially-available catalysts, namely E-tek's Pt/C (20% metals) and PtRu/C catalysts (20% metals). The electrocatalytic ORR data were obtained at E-tek's Pt/C catalysts (20% metals) in both alkaline and acidic electrolytes.

The Levich plot analysis of the RDE data for the ORR of E-tek's Pt/C catalyst (20% wt) in acidic electrolyte reveal n=4.0±0.2, consistent with a 4e⁻ process for the reduction of $O_2$ to $H_2O$ at the Pt catalyst. Similar results are obtained for an ORR in the alkaline electrolyte. In comparison with the Pt/C data, the n values obtained with our Au/C and AuPt/C catalysts are between approximately 3.0-3.6, displaying an increase of n with increasing Pt composition in the bimetallic nanoparticles. The fact that the obtained n values fall between n=2 and n=4 likely suggests that both 2e⁻ reduction to $H_2O_2$ and 4e⁻ reduction to $H_2O$ processes are operative with the catalysts. One possible explanation may be the presence of large-sized particles in the thermally treated catalysts. A further delineation of the surface composition, particle size and treatment condition are expected to provide more insights into the detailed catalytic mechanism.

Figure 10:
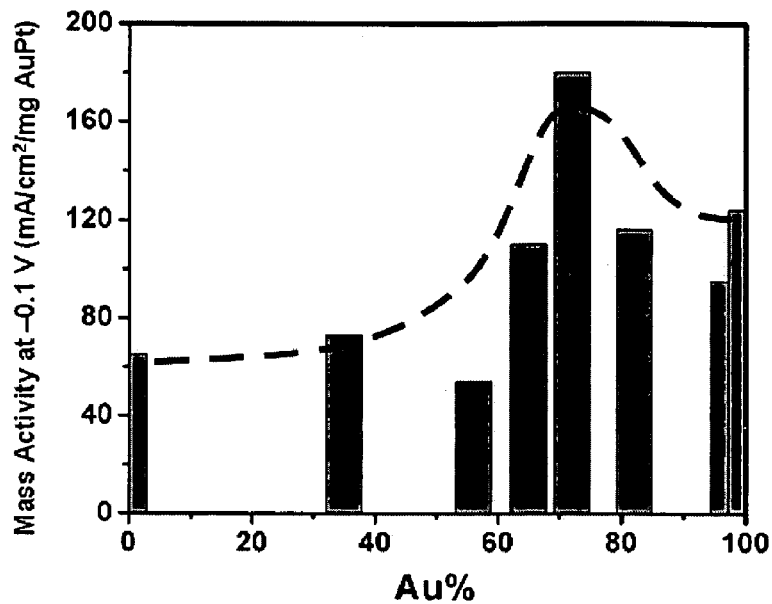
FIG. 10 is a chart and overlaid plot showing mass activities from RDE measurements for an ORR in 0.5M KPH vs. a bimetallic composition.

One important discovery is that the electrocatalytic activity for the bimetallic AuPt catalysts falls between that of Au and Pt catalysts. This may be seen in FIGS. 10a and 10b which show data obtained from RDE measurements for an ORR for three different catalysts, Au/C, Pt/C, and $Au_{72}Pt_{28}$/C.

In addition to exploring similar pathways for high-throughput screening of combinatorial array catalysts as demonstrated by others, combinatorial analysis was applied to a limited number of experiments for optimization and directing further experiments in the preparation of best catalysts. This focus is largely based on unique approach of the present invention to the design of size-, composition- and phase-controllable catalysts at the nanoscale which involves synthesis, processing, assembly and thermal treatment.

Figure 11A:
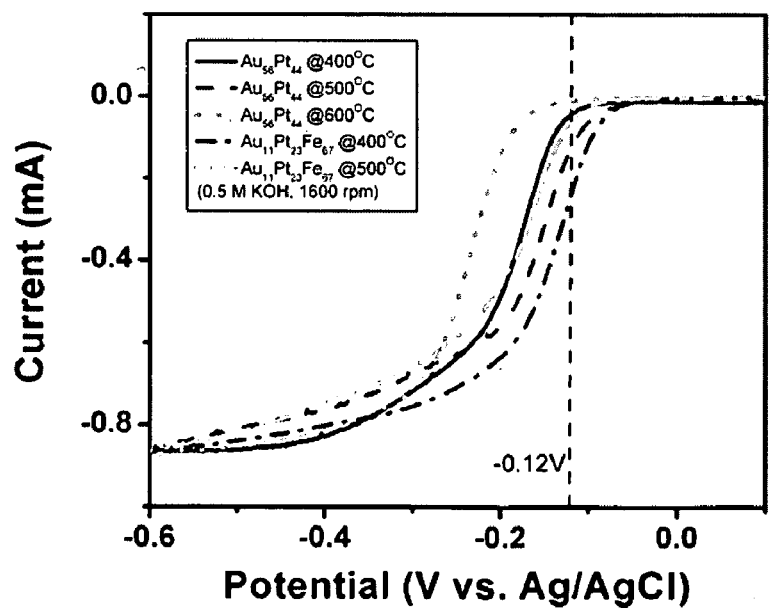
FIG. 11a is a series of RDE plots (1600 rpm) for AuPt/C and AuPtFe/C catalysts in 0.5 M KOH electrolyte saturated with O2.
Figure 11B:
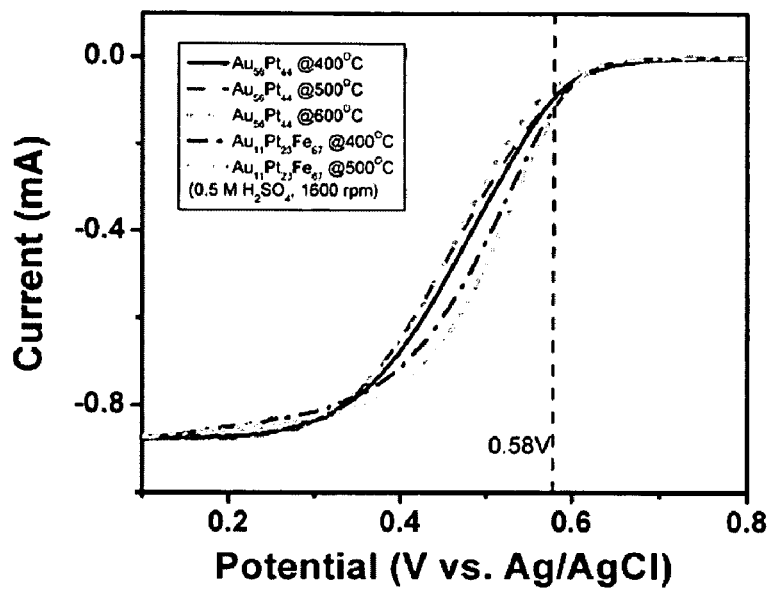
FIG. 11b is a series of RDE plots for AuPt/C and AuPtFe/Ccatalysts in 0.5 M $H_2SO_4$ electrolyte saturated with $O_2$.

Both $Au_nPt_{100-n}$ and $Au_nPt_mFe_{100-m-n}$ catalysts are compared to evaluate their electrocatalytic activities for ORR and MOR. FIGS. 11a-11b and Tables 3-4 illustrate a few examples.

FIGS. 11a-11b compares the RDE data for ORR at several $Au_nPt_{100-n}$ and $Au_nPt_mFe_{100-m-n}$ catalysts of different compositions in an alkaline and an acidic electrolyte, respectively.

The multimetallic nanoparticle catalysts are mixed with Nafion and loaded on glassy carbon electrode for MOR and ORR electrochemical characterizations. Both current ($i_p$) and Tafel analysis provide data for assessing the electrocatalytic activity for MOR, whereas the kinetic current ($i_k$) from the RDE data and Tafel analysis data provide measures for assessing the electrocatalytic activity for ORR. Tables 3 and 4 summarizes two sets data for the AuPt/C and AuPtFe/C catalysts for MOR in 0.5 M KOH and ORR in 0.5 M KOH and 0.5 M $H_2SO_4$. The data are also compared with commercially-available catalysts (e.g., E-tek's catalysts).

TABLE 3

Electrocatalytic MOR activities in 0.5 M KOH

| Catalyst/C | $T_c = 400°$ C. | | $T_c = 500°$ C. | | $T_c = 600°$ C. | |
| --- | --- | --- | --- | --- | --- | --- |
| | TS | $i_{pa}$ | TS | $i_{pa}$ | TS | $i_{pa}$ |
| Au | | | | 349 | | |
| Pt | | | | 8092 | | |
| $Au_{97}Pt_3$ | | | 106 | 1869 | | |
| $Au_{82}Pt_{18}$ | 127 | 6518 | 149 | 8536 | | |
| $Au_{72}Pt_{28}$ | 155 | 2821 | 148 | 5291 | | |
| $Au_{65}Pt_{35}$ | | | 106 | 7875 | | |
| $Au_{60}Pt_{40}$ | | | 165 | 4482 | | |
| $Au_{56}Pt_{44}$ | 154 | 855 | 101 | 4432 | 120 | 4078 |
| $Au_{50}Pt_{65}$ | | | | 4884 | | |
| $Au_{11}Pt_{23}Fe_{66}$ | 130 | 1215 | 154 | 729 | | |

TABLE 4

ORR activities in 0.5 M KOH and 0.5 M $H_2SO_4$ saturated with $O_2$

| Catalyst/C | In 0.5 M KOH | | | | | | In 0.5 M $H_2SO_4$ | | | | | |
| --- | --- | --- | --- | --- | --- | --- | --- | --- | --- | --- | --- | --- |
| | $T_c = 400°$ C. | | $T_c = 500°$ C. | | $T_c = 600°$ C. | | $T_c = 400°$ C. | | $T_c = 500°$ C. | | $T_c = 600°$ C. | |
| | TS | $I_{E=-0.1V}$ | TS | $I_{E=-0.1V}$ | TS | $I_{E=-0.1V}$ | TS | $I_{E=0.55V}$ | TS | $I_{E=0.55V}$ | TS | $I_{E=0.55V}$ |
| Au | | | 55.8 | 124 | | | | | 143.6 | 7 | | |
| Pt | | | 52.2 | 62 | | | | | 86.1 | 432 | | |
| $Au_{97}Pt_3$ | | | 55.9 | 95 | | | | | 161.2 | 9 | | |
| $Au_{82}Pt_{18}$ | | | | 116 | | | | | | 8 | | |
| $Au_{72}Pt_{28}$ | 67.0 | 125 | 54.8 | 180 | | | 116.1 | 32 | 108.3 | 37 | | |

TABLE 4-continued

ORR activities in 0.5 M KOH and 0.5 M $H_2SO_4$ saturated with $O_2$

| Catalyst/ | In 0.5 M KOH | | | | | | In 0.5 M $H_2SO_4$ | | | | | |
|---|---|---|---|---|---|---|---|---|---|---|---|---|
| | $T_c = 400°$ C. | | $T_c = 500°$ C. | | $T_c = 600°$ C. | | $T_c = 400°$ C. | | $T_c = 500°$ C. | | $T_c = 600°$ C. | |
| C | TS | $I_{E=-0.1V}$ | TS | $I_{E=-0.1V}$ | TS | $I_{E=-0.1V}$ | TS | $I_{E=-0.55V}$ | TS | $I_{E=-0.55V}$ | TS | $I_{E=-0.55V}$ |
| $Au_{65}Pt_{35}$ | | | 59.9 | 110 | | | | | 112.3 | 63 | | |
| $Au_{56}Pt_{44}$ | 51.1 | 54 | 59.5 | 54 | 56.7 | 8 | 88.0 | 190 | 96.3 | 203 | 89.1 | 127 |
| $Au_{35}Pt_{65}$ | | | | 73 | | | | | | 100 | | |
| $Au_{11}Pt_{23}Fe_{46}$ | 47.6 | 332 | 49.5 | 76 | | | 65.3 | 386 | 63.6 | 347 | | |

Note The mass activity $I_g$ (mA/cm$^2$/mg Mt) was obtained form RDE kinetic current at E and 1600 rpm, 5 mV/s.
Catalyst metal loading: 20%. Mt: total metals. TS: Tafel slope (mV/dec); $T_c$: thermal treatment temperature. (Reference electrode: Ag/AgCl, Sat'd KCl)

The results demonstrate that the composition can significantly modify the electrocatalytic properties of both Au and Pt. The bimetallic alloy AuPt nanoparticle catalysts exhibit a synergistic activity which depends not only on the composition, but also on the nature of the electrolyte. For MOR, the mass activity in the alkaline electrolyte exhibits a maximum in the composition region of 65~85% Au, in contrast to the gradual increase from no activity of Au to a high activity of Pt in the acidic electrolyte. For ORR, the mass activities displays a maximum in the composition region of 60-80% Au, which is higher than Pt/C and Au/C by a factor of 2-3, in contrast to the gradual increase from a small activity of Au to a high activity of Pt in the acidic electrolyte. The Au-based bimetallic and trimetallic nanoparticle catalysts supported on carbon materials are electrocatalytically active for both MOR and ORR reactions, depending on the nature of the electrolytes and the temperature used for the thermal treatment. In alkaline condition, the binary and the ternary catalysts serve as good catalysts for MOR and ORR. In acidic condition, the catalysts serve as good catalysts for ORR. In addition to be CO-tolerant because of the presence of gold in the catalysts, the catalysts not only reduce the possibility of OH⁻ adsorption on the catalysts but also increase the tolerance of methanol.

The method of the present invention teaches preparation of gold-based monometallic, bimetallic and trimetallic nanoparticles having monodispersed sizes and controlled compositions. These nanoparticles are useful as MOR and ORR electrocatalysts. The nanoparticle compositions can significantly modify the electrocatalytic properties of both Au and Pt. The approach is useful for developing effective gold-based catalysts for improving fuel cell anode and cathode reactions. Specifically, carbon-supported Au nanoparticle catalysts which can be treated under controlled conditions have been prepared.

Several protocols for synthesizing Au-based bimetallic and trimetallic nanoparticles using chemical reduction coupled to thermal decomposition are provided. In addition, bimetallic nanoparticle catalysts after controlled treatment are shown to be single-phase alloys. It has also been shown that Au-based monometallic, bimetallic and trimetallic nanoparticle catalysts supported on carbon materials are electrocatalytically active towards both MOR and ORR reactions. Further, it has been shown that the catalytic activity of the bimetallic and trimetallic catalysts is dependent on the temperature used for the thermal treatment.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A fuel cell catalyst comprising:
a particulate support and
gold core-shell nanoparticles having a formula of $Au_yPt_zM_{100-(y+z)}$, wherein y and z are integers between 1 and 99, and M is at least one metal selected from the group consisting of Ti, Cr, Mn, Fe, and W, wherein the shells of said gold core-shell nanoparticles remain intact and are responsible for interaction with said particulate support.

2. The fuel cell catalyst as recited in claim 1, wherein said particulate support is selected from the group consisting of carbon, silicon, and combinations thereof.

3. The fuel cell catalyst as recited in claim 2, wherein said particulate support is in the form of carbon spheres having diameters in approximately the 10-1000 nm range.

4. The fuel cell catalyst as recited in claim 1, wherein said core-shell nanoparticles comprise alkanethiolate shells.

5. The fuel cell catalyst as recited in claim 3, wherein said carbon spheres have diameters in the range of 30-50 nm.

6. The fuel cell catalyst as recited in claim 1, wherein the nanoparticles have a relative size monodispersity of ±0.6 nm.

* * * * *